United States Patent
Palmer

(10) Patent No.: US 12,326,807 B2
(45) Date of Patent: Jun. 10, 2025

(54) ADJUSTMENT TO GRANULARITY OF LOGICAL-TO-PHYSICAL TABLE

(71) Applicant: Micron Technology, Inc., Boise, ID (US)

(72) Inventor: David A. Palmer, Boise, ID (US)

(73) Assignee: Micron Technology, Inc., Boise, ID (US)

(*) Notice: Subject to any disclaimer, the term of this patent is extended or adjusted under 35 U.S.C. 154(b) by 24 days.

(21) Appl. No.: 18/519,871

(22) Filed: Nov. 27, 2023

(65) Prior Publication Data

US 2024/0176748 A1 May 30, 2024

Related U.S. Application Data

(60) Provisional application No. 63/428,824, filed on Nov. 30, 2022.

(51) Int. Cl.
*G06F 12/02* (2006.01)

(52) U.S. Cl.
CPC .. *G06F 12/0246* (2013.01); *G06F 2212/7201* (2013.01)

(58) Field of Classification Search
CPC ............ G06F 12/0246; G06F 2212/7201
See application file for complete search history.

(56) References Cited

U.S. PATENT DOCUMENTS

| | | | |
|---|---|---|---|
| 9,323,667 B2 | 4/2016 | Bennett | |
| 10,871,907 B2 | 12/2020 | Palmer | |
| 2018/0101477 A1* | 4/2018 | Kan | G06F 12/0246 |
| 2018/0293174 A1 | 10/2018 | Song et al. | |
| 2020/0379910 A1* | 12/2020 | Muthiah | G06F 12/0873 |

* cited by examiner

*Primary Examiner* — Chie Yew
(74) *Attorney, Agent, or Firm* — Brooks, Cameron & Huebsch, PLLC

(57) ABSTRACT

An apparatus can include a memory device and a controller coupled thereto. The controller can be configured to maintain a logical-to-physical (L2P) table including logical block addresses (LBAs). The LBAs are organized as partitions of the L2P table. Each partition of the L2P table includes a respective subset of the LBAs. The controller can be configured to monitor, for each partition of the LBA, a quantity of read/modify/write (R/M/W) operations and a quantity of read operations performed on the memory device at the respective subset of the LBAs. The controller can be configured to for each partition of the L2P table and based on the quantities of R/M/W operations and read operations performed on the memory device at the respective subset of the LBAs, adjust a value of respective granularities of the L2P table.

20 Claims, 4 Drawing Sheets

US 12,326,807 B2

ADJUSTMENT TO GRANULARITY OF LOGICAL-TO-PHYSICAL TABLE

PRIORITY INFORMATION

This application claims the benefit of U.S. Provisional Application No. 63/428,824, filed Nov. 30, 2022, the contents of which are incorporated herein by reference.

TECHNICAL FIELD

Embodiments of the disclosure relate generally to computing systems, and more specifically, relate to determining adjustments to granularity of a logical-to-physical (L2P) table of a memory device.

BACKGROUND

Flash-based storage devices may use a logical-to-physical (L2P) table to map a logical block address (LBAs) space (of a host, for example) to a physical address space. A L2P table may use a granularity of one pointer for an LBA. A drawback of using a coarse granularity for an L2P table may be that performing write operations associated with less data than the granularity may lead to performing read/modify/write (R/M/W) operations. Performing R/M/W operations may consume more resources (e.g., time, power) and wear down memory cells (e.g., via additional program/erase cycles).

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
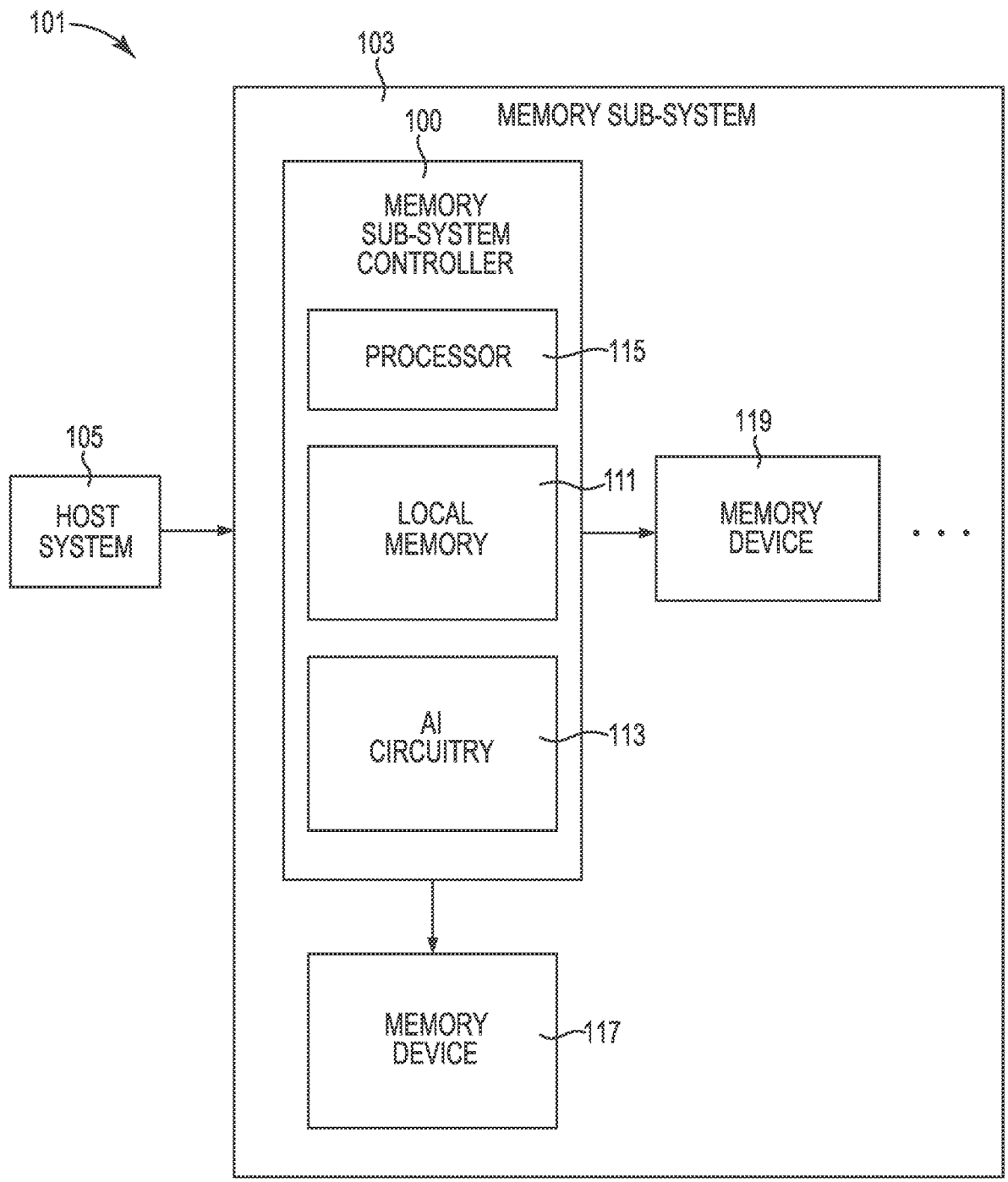
FIG. 1 illustrates an example computing system that includes a memory sub-system in accordance with some embodiments of the present disclosure.

At least one embodiments of present disclosure provides a controller and memory device (e.g., NAND array) a capability to determine whether to adjust a granularity of an L2P table and adjust the granularity based on that determination. In some embodiments, a controller coupled to a memory device can determine whether to adjust a granularity of an L2P table dynamically (e.g., "on-the-fly") based on execution of write commands and/or read commands by the memory device using that granularity. As described herein, embodiments of the present disclosure provide flexibility and adaptability of multiple granularities of an L2P table not possible by previous approaches.

Previous approaches to operating a memory device with respect to granularities of an L2P table employed by a memory device are limited. For example, a memory device may be provided with a single granularity to employ for the life of the memory device. Because of this limitation, operation of and/or performance of a memory device may not be optimized for execution of write commands and/or read commands by that memory device.

Some previous approaches include using a granularity of one pointer for each LBA of an L2P table. A manufacturer of a storage device may not anticipate a manner in which the storage device may be used (by an end user, for example). Using a pointer for each LBA may be inefficient but would be satisfactory for most, if not all, manners in which the storage device may be used. For example, a "worst case scenario" of a workload of a storage device may benefit from an L2P table having such a fine granularity of one pointer each LBA. However, the storage device may not be undergo such an intense workload all of the time, if at all. Partitions of a memory device of a storage device may be used different manners. For example, one partition of a memory device may undergo a workload that benefits from a fine granularity (e.g., one pointer per LBA) of an L2P table, but another partition of the memory device may undergo a less intense workload such that a coarser granularity (e.g., one pointer per two LBAs) may be beneficial.

At least one embodiment of the present disclosure provides the ability to adjust granularities of an L2P table of a memory device not provided by previous approaches. Embodiments of the present disclosure can include a storage device (also referred to herein as a memory sub-system) having a controller that can adjust one or more granularities of partitions of an L2P table associated with one or more memory devices of the storage device. LBAs of an L2P table can be organized as partitions of the L2P table. Each partition of the L2P table can include a respective subset of the LBAs. A partition of an L2P table of a memory device can correspond to one or more partitions of the memory device. Adjusting the granularities can enable optimization of the granularities associated with the partitions of the L2P table, which can improve the efficiency of a storage device. Non-limiting examples of improving the efficiency of a storage device include reducing power consumption of the storage device, improving the performance (e.g., reducing latency) of the storage device, reducing wear (improve endurance) of memory cells of the storage device, and reducing overprovisioning of LBAs (using too fine a granularity).

Data written to one or more LBAs of a memory device infrequently, such as photos and music, can utilize a coarse granularity for a partition of an L2P table including those LBAs. Data written to one or more LBAs of a memory device frequently can utilize a fine granularity for a partition of an L2P table including those LBAs. Utilizing coarse granularities can reduce the size of an L2P table. For instance, LBAs can be converted to fewer blocks of a partition of an L2P table. Utilizing coarse granularities can improve sustained performance of a memory device by improving the efficiency of garbage collection of the memory device. Utilizing coarse granularities can increase cache sizes for caching architectures. Utilizing coarse granularities can reduce the frequency of and/or latency associated with garbage collection of a L2P table. Utilizing coarse granularities can improve an efficiency of an L2P cache controller because the same bytes map to more entries of an L2P table, which can increase a cache hit rate. Utilizing coarse granularities can reduce latency associated with writing (e.g., updating) entries (e.g., LBAs) of an L2P table. However, utilizing coarse granularities is not without drawbacks. For instance, utilizing a coarse granularity for a partition of a L2P table can increase how many (increase quantity of) R/M/W operations are performed on a memory device at LBAs of that partition.

At least one embodiment enables granularities of an L2P table to be adjusted dynamically. Adjustment of the granularities can be controlled by artificial intelligence (AI) (e.g., AI circuitry), external data sources, and/or machine learning. As described herein, AI can be employed to determine, during operation of a memory device, whether a granularity of an L2P table can be adjusted and implement that adjustment. As used herein, "external data sources" refer to repositories of data associated with types of memory devices and/or uses of memory devices.

AI circuitry can be configured to combine data using iterative processing and algorithms such that the AI circuitry learns from patterns and/or features in the data. A non-limiting example of AI circuitry can be a neural network. As used herein, "neural network" refers to software, hardware, or combinations thereof configured to process data in a manner similar to neurons of a human brain. Artificial neural networks can include various technologies such as deep learning and machine learning. As used herein, "machine learning" refers to an ability software, hardware, or combinations thereof to learn and improve from experience without improvements being explicitly programmed. As used herein, "deep learning" refers to machine learning methods based on artificial neural networks with representation learning, which can be supervised, semi-supervised or unsupervised.

The figures herein follow a numbering convention in which the first digit or digits correspond to the drawing figure number and the remaining digits identify an element or component in the drawing. Analogous elements within a figure may be referenced with a hyphen and extra numeral or letter. Such analogous elements may be generally referenced without the hyphen and extra numeral or letter. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 illustrates an example computing system 101 that includes a memory sub-system 103 in accordance with some embodiments of the present disclosure. The memory sub-system 103 can include media, such as one or more volatile memory devices 117, one or more non-volatile memory devices 119, or a combination thereof. The volatile memory devices 117 can be, but are not limited to, random access memory (RAM), such as dynamic random access memory (DRAM), synchronous dynamic random access memory (SDRAM), and resistive DRAM (RDRAM).

The memory sub-system 103 can be a storage device, a memory module, or a hybrid of a storage device and memory module. Examples of a storage device include an SSD, a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 101 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 101 includes a host system 105 that is coupled to one or more of the memory sub-systems 103. In some embodiments, the host system 105 is coupled to different types of the memory sub-systems 103. FIG. 1 illustrates an example of a host system 105 coupled to a single memory sub-system 103. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 105 includes or is coupled to processing resources, memory resources, and network resources. As used herein, "resources" are physical or virtual components that have a finite availability within the computing system 101. For example, the processing resources include a processing device, the memory resources include the memory sub-system 103 for secondary storage and main memory devices (not specifically illustrated) for primary storage, and the network resources include as a network interface (not specifically illustrated). The processing device can be one or more processor chipsets, which can execute a software stack. The processing device can include one or more cores, one or more caches, a memory controller (e.g., NVDIMM controller), and a storage protocol controller (e.g., PCIe controller, SATA controller, etc.). The host system 105 can use the memory sub-system 103, for example, to write data to the memory sub-system 103 and/or read data from the memory sub-system 103.

The host system 105 can be coupled to the memory sub-system 104 via a physical host interface. Examples of a physical host interface include, but are not limited to, a serial advanced technology attachment (SATA) interface, a PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open not-and (NAND) Flash Interface (ONFI), Double Data Rate (DDR), Low Power Double Data Rate (LPDDR), or any other interface. The physical host interface can be used to transmit data between the host system 105 and the memory sub-system 103. The host system 105 can further utilize an NVM Express (NVMe) interface to access the non-volatile memory devices 119 when the memory sub-system 103 is coupled with the host system 105 by the PCIe interface. The physical host interface can provide an interface for passing control, address, data, and other signals between the memory sub-system 103 and the host system 105. The host system 105 can access multiple memory sub-systems via a same communication connection, multiple separate communication connections, and/or a combination of communication connections.

The host system 105 can send requests to the memory sub-system 103, for example, to store data on the memory sub-system 103 and/or to read data from the memory sub-system 103. The data to be written or read, as specified by a host request, can be referred to as "host data." A host request can include logical address information. The logical address information can be an LBA, which may include or be accompanied by a partition number. The logical address information is the location the host system associates with the host data. The logical address information can be part of metadata for the host data. The LBA may also correspond (e.g., dynamically map) to a physical address, such as a physical block address (PBA), that indicates the physical location where the host data is stored in memory.

An example of non-volatile memory devices 116 include NAND type flash memory. NAND type flash memory includes, for example, two-dimensional NAND (2-D NAND) and three-dimensional NAND (3-D NAND). The non-volatile memory devices 119 can be other types of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), and 3-D cross-point memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Each of the non-volatile memory devices 119 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the non-volatile memory devices 119 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the non-volatile memory devices 119 can be grouped as pages that can refer to a logical unit of the memory device used to store data. With some types of memory (e.g., NAND), pages can be grouped to form blocks.

The memory sub-system controller 100, which can be referred to as the controller 100 for simplicity, can communicate with the non-volatile memory devices 119 to perform operations such as reading data, writing data, erasing data, and other such operations at the non-volatile memory devices 119. The controller 100 can include hardware such as one or more integrated circuits and/or discrete components, a buffer memory, or a combination thereof. The hardware can include a digital circuitry with dedicated (i.e., hard-coded) logic to perform the operations described herein. The controller 100 can be a microcontroller, special purpose logic circuitry (e.g., a field programmable gate array (FPGA), an application specific integrated circuit (ASIC), etc.), or other suitable circuitry.

The controller 100 can include a processing device 115 (e.g., a processor) configured to execute instructions stored in a local memory 111. In the illustrated example, the local memory 111 of the controller 100 is an embedded memory configured to store instructions for performing various processes, operations, logic flows, and routines that control operation of the memory sub-system 103, including handling communications between the memory sub-system 103 and the host system 105.

In some embodiments, the local memory 111 can include memory registers storing memory pointers, fetched data, etc. The local memory 111 can also include ROM for storing micro-code, for example.

In general, the controller 100 can receive information or operations from the host system 105 and can convert the information or operations into instructions or appropriate information to achieve the desired access to the non-volatile memory devices 119 and/or the volatile memory devices 117. The controller 100 can be responsible for other operations such as wear leveling operations, error detection and/or correction operations, encryption operations, caching operations, and address translations between a logical address (e.g., an LBA) and a physical address (e.g., a PBA) associated with the non-volatile memory devices 119. The memory sub-system controller 100 can further include host interface circuitry (not shown) to communicate with the host system 105 via the physical host interface. The host interface circuitry can convert a query received from the host system 105 into a command to access the non-volatile memory devices 119 and/or the volatile memory devices 117 as well as convert responses associated with the non-volatile memory devices 119 and/or the volatile memory devices 117 into information for the host system 105.

In at least one embodiment, the controller 100 can maintain an L2P table including LBAs of the memory device 119. The LBAs can be organized as partitions of the L2P table. Each partition of the L2P table can include a respective subset of the LBAs. The controller 100 can monitor, for each partition of the L2P table, a quantity R/M/W operations and/or a quantity of read operations performed on the memory device 119 at the respective subset of the LBAs. If a granularity of an L2P table is coarse, writing an amount of data to the memory device 119 that is smaller than the granularity of the partition of the L2P table can lead to performance of R/M/W operations, which can consume more resources (e.g., time, power) and cause more wear to memory cells of the memory device 119 than write operations. Thus, performance of R/M/W operations can be indicative of the granularity of the partition of the L2P table being too coarse. If multiple read operations are performed to execute a single read command, then the granularity of the partition of the L2P table may be too fine. The controller 100 can adjust, each partition of the L2P table, a granularity of the partition based on the quantity of R/M/W operations and/or the quantity of read operations performed on the memory device 119 at the LBAs of the partition. For example, a value of a granularity of a partition can be adjusted to a lesser value (a finer granularity) in response to R/M/W operations being performed at LBAs of the partition. A value of a granularity of a partition can be adjusted to a greater value (a coarser granularity) in response to multiple read operations being performed, at LBAs of the partition, to execute a single read command.

In some embodiments, a threshold can be used to trigger an adjustment of a granularity. For example, the controller 100 can determine, for a partition of an L2P table, whether the quantity of R/M/W operations performed on the memory device 119 at the LBAs of the partition exceeds a threshold quantity of R/M/W operations and adjust the granularity of the partition to a lesser value in response to determining that the threshold is exceeded. The controller 100 can determine, for a partition of an L2P table, whether the quantity of read operations performed on the memory device 119 at LBAs of the partition exceeds a threshold quantity of read operations and adjust the granularity of the partition to a greater value in response to determining that the threshold is exceeded.

In some embodiments, weights can be assigned to different factors associated with determining whether to adjust a granularity of a L2P table of the memory device 119. For example, a weight can be assigned to quantities of R/M/W operations performed on the memory device 119 at LBAs of a partition of an L2P table. Weights can be assigned to quantities of read operations determined to be performed to execute a read command and quantities of read operations performed in association with execution of the read command. The controller 100 can determine whether a sum of the weighted quantities exceeds a threshold value, and, based on whether the sum exceeds the threshold value, adjust the granularity of the partition or continue to utilize the granularity (unadjusted). One or more of the weights can be the same or different. The weights can be tailored to how the memory device 119 and/or the memory sub-system 103 is used.

In some embodiments, a neural network implemented on the controller 100 (e.g., implemented on the AI circuitry 113) can be trained based on quantities of R/M/W operations performed on the memory device 119 at LBAs of a partition of an L2P table and/or a difference of quantities of read operations determined to be performed to execute a read command and quantities of read operations performed in association with execution of the read command. Whether to adjust a granularity of a partition of an L2P table can be determined via the neural network.

In at least one embodiment, the controller 100 can include AI circuitry 113. The AI circuitry 113 can be configured to adjust, for one or more partitions of an L2P table of the memory device 119, respective granularities of the L2P table based on the quantity of R/M/W operations and/or the quantity of read operations performed on the memory device 119 at LBAs of the partitions.

Figure 2:
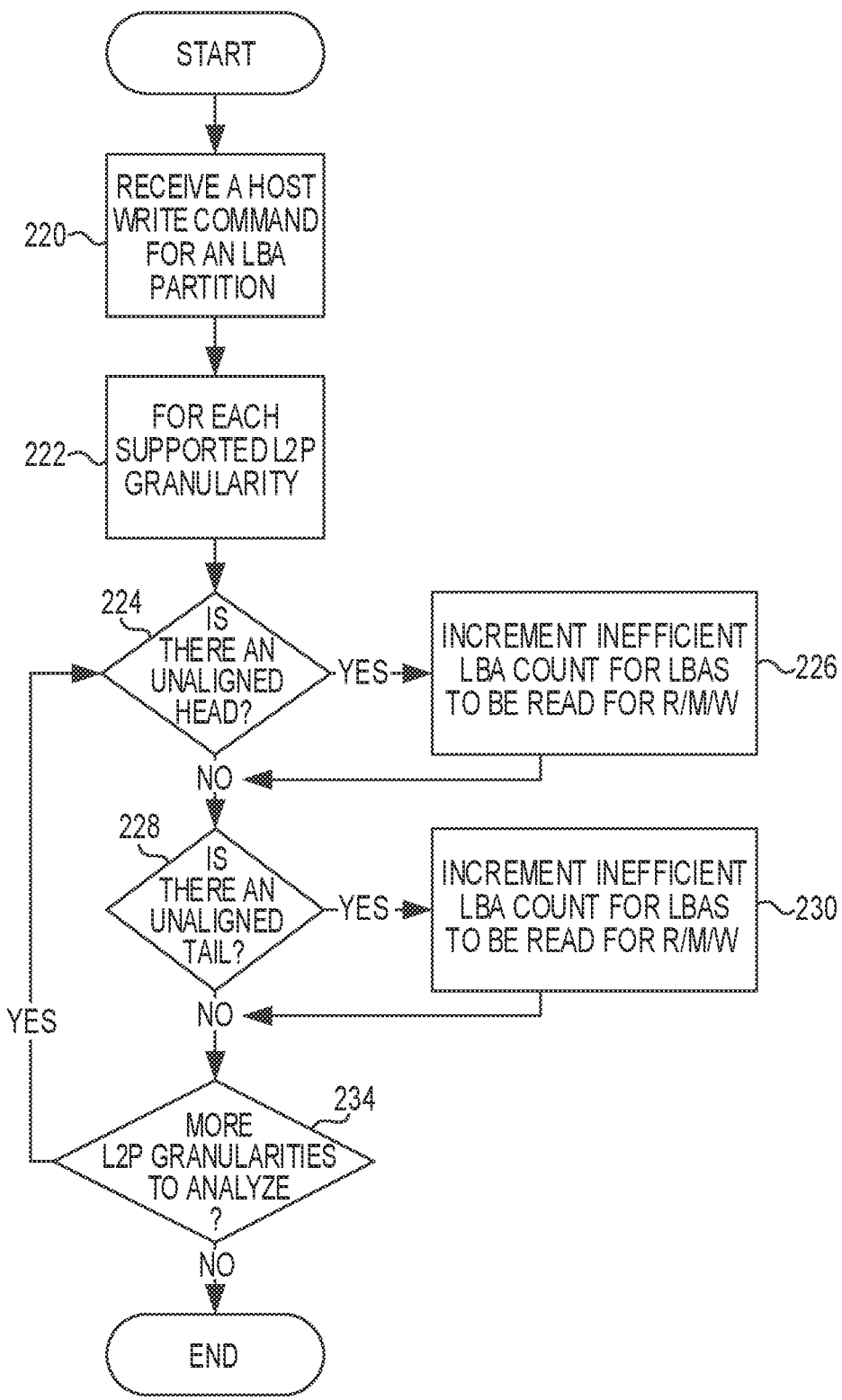
FIG. 2 is a flow diagram of an example method for operating a memory device in accordance with some embodiments of the present disclosure.

FIG. 2 is a flow diagram of an example method for operating a memory device in accordance with some embodiments of the present disclosure. The method can be performed by processing logic, for example, that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method can be performed by or using the memory sub-system controller 100, processing device 115, AI circuitry 113, and/or non-volatile memory device 119 and/or volatile memory device 117 described in association with FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 220 in the example method of FIG. 2, a write command can be received, from a host (e.g., the host system 105), that is associated with one or more LBAs corresponding to a partition of an L2P table of a memory device (e.g., the memory device 119). A write command can include a pointer that indicates a initial LBA at which data is to be written to a memory device and/or a last LBA at which data is to be written to the memory device. The initial LBA can be a head of a pointer and the last LBA can be a tail of a pointer.

As indicated at block 222, the L2P table can support multiple granularities. One or more of these granularities can be evaluated to determine whether a different granularity can be utilized.

At block 224, whether a head of a pointer of the L2P table corresponding to the partition is unaligned can be determined. If, for the particular granularity, the pointer has an unaligned head, then, for the particular granularity, execution of the write command at the initial LBA will require a R/M/W operation to performed instead of a write operation. For example, if the particular granularity is 16 kB that spans four LBAs such that partitions begin at LBA 0, LBA 4, LBA 8, etc. (multiples of four) and the LBA of the head is not a multiple of four, then the head is unaligned.

Performing a R/M/W operation includes reading additional data to align the unaligned head. Then, the data (from the host) of the head (data to be written at the LBA of the head) and the additionally read data is written in association with executing the write command as compared to just writing the data of the head (at the LBA of the head without additionally read data) in association with executing the write command. Continuing the example from above where the particular granularity spans four LBAs, assume that LBA 7 is the LBA of the head such that the head is unaligned. In order to maintain the particular granularity, data at LBA 4, LBA 5, and LBA 6 of the partition that includes LBA 7 is read (read of a R/M/W operation) and then the read data is combined with the data to be written to LBA 7 (modify of a R/M/W operation). The combined data is then written (write of a R/M/W operation) to LBAs 4-7 as a 16 kB chunk.

Having an unaligned head can be indicative of the particular granularity being too coarse and inefficient because extra work is done, via reading data in performance of a R/M/W operation instead of a write operation, in association with execution the write command. Accordingly, as indicated at block 226, if the head is determined to be unaligned, a count (a quantity) of inefficient LBAs (inefficient due to a read of a R/M/W operation needing to be performed at the LBAs) can be incremented. A counter (of a controller, for example) can be used to monitor the count of inefficient LBAs.

At block 228, whether a tail of a pointer of the L2P table corresponding to the partition is unaligned can be determined. If, for the particular granularity, the pointer has an unaligned tail, then, for the particular granularity, execution of the write command at the LBA of the tail will require a R/M/W operation to performed instead of a write operation. For example, if the particular granularity is 16 kB that spans four LBAs such that partitions end at LBA 3, LBA 7, LBA 11, etc. and the LBA of the tail is not LBA 3, LBA 7, LBA 11, etc., then the tail is unaligned.

Performing a R/M/W operation includes reading additional data to align the unaligned tail. Then, the data (from the host) of the tail (data to be written at the LBA of the tail) and the additionally read data is written in association with executing the write command as compared to just writing the data of the tail (at the LBA of the tail) without additionally read data) in association with executing the write command. Continuing the example from above where the particular granularity spans four LBAs, assume that LBA 16 is the LBA of the tail such that the tail is unaligned. In order to maintain the particular granularity, data at LBA 17, LBA 18, and LBA 19 of the partition that includes LBA 16 is read (read of a R/M/W operation) and then is combined with the data to be written to LBA 16 (modify of a R/M/W operation). The combination of data is then written (write of a R/M/W operation) to LBAs 16-19 as a 16 kB chunk.

Having an unaligned tail can be indicative of the particular granularity being too coarse and inefficient because extra work is done, via reading data in performance of a R/M/W operation instead of a write operation, in association with execution the write command. Accordingly, as indicated at block 230, if the tail is determined to be unaligned, a count (a quantity) of inefficient LBAs (inefficient due to a read of a R/M/W operation needing to be performed at the LBAs) can be incremented. A counter (of a controller, for example) can be used to monitor the count of inefficient LBAs.

In at least one embodiment, the same counter can be used to monitor inefficient LBAs resulting from both unaligned heads and unaligned tails of a pointer. If a value of either of the counters exceeds a threshold value, then a different granularity (other than the particular granularity) can be utilized. Whether to utilize a different granularity can be determined based on the values of the counters. As indicated at block 234, multiple granularities, for one or more partitions of an L2P table, can be evaluated to determine a more efficient granularity for one or more partitions of the L2P table. Each respective granularity can have one or more corresponding counters as described in association with blocks 226 and 230.

Figure 3:
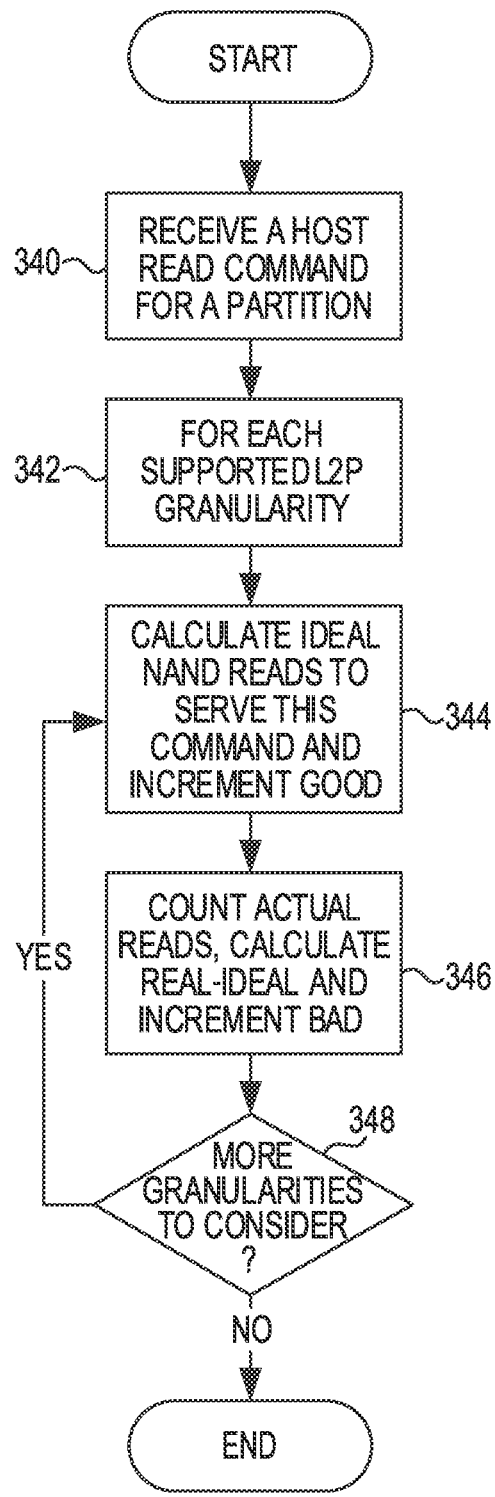
FIG. 3 is a flow diagram of an example method for operating a memory device in accordance with some embodiments of the present disclosure.

FIG. 3 is a flow diagram of an example method for operating a memory device in accordance with some embodiments of the present disclosure. The method can be performed by processing logic, for example, that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method can be performed by or using the memory sub-system controller 100, processing device 115, AI circuitry 113, and/or non-volatile memory device 119 and/or volatile memory device 117 described in association with FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 340 in the example method of FIG. 3, a read command can be received, from a host (e.g., the host system 105), that is associated with an LBA corresponding to a partition of an L2P table of a memory device (e.g., the memory device 119). As indicated at block 342, the L2P table can support multiple granularities. One or more of these granularities can be evaluated to determine whether a different granularity can be utilized, which of the evaluated granularities are more efficient than others, and/or which of the evaluated granularities is the most efficient.

At block 344, for a particular granularity, prior to execution of the read command, a quantity of read operations associated with execution of the read command can be determined. This quantity can be referred to as an "ideal" quantity of read operations to execute the read command using the particular granularity. A counter (of a controller, for example) can be used to indicate this "good" quantity of read operations.

At block 346, for the particular granularity, the actual quantity of read operations performed, at LBAs of one or more partitions of an L2P table, to execute the read command can be determined. A counter (of a controller, for example) can be used to indicate the difference of the actual quantity of read operations and the "ideal" quantity of read operations. The difference can be referred to as a "bad" quantity of read operations. A non-zero difference indicates that an extra read operation was performed. An extra read operation may be performed if the data to be read is stored fragmented on the memory device (e.g., a NAND device. As used herein, "fragmented" refers to data that is not stored contiguously (physically and/or logically) on a memory device. For instance, assume that a L2P table has a granularity of 8 kilobytes (KB) and, as a result of the 8 kB granularity, 16 kB of data is written to a memory device in two (2) 8 kB-write operation such that the respective 8 KB of data is stored fragmented on the memory device. If that 16 kB of data is to be read in association with execution of a single read command, then execution of the read command may include performing two (2) read operations to read the respective 8 KB portions of the 16 kB of data. However, if the L2P table had a granularity of 16 kB, then the host may have written the 16 kB of data in a single 16 kB-write operation so that the 16 kB of data would be stored contiguously (physically and/or logically) on the memory device. As a result, execution of the host read command could be serviced by performing a single read operation to read the 16 kB of data.

Thus, if the counter is incremented frequently and/or regularly in response to greater than the "ideal" quantity of read operations being performed, then that can be indicative of a coarser granularity (16 kB as compared to 8 kB) being beneficial and more efficient. A coarser granularity can reduce, or eliminate, the extra read operations by reducing, or eliminating, writing data to a memory array so that the data is stored fragmented. If the value of the counter exceeds a threshold value, a different granularity having a greater value (a coarser granularity) can be utilized for LBAs corresponding to the partitions. If the value of the counter does not exceed the threshold value, then the particular granularity can be utilized for the partitions.

As indicated at block 348, multiple granularities can be evaluated to determine a more efficient granularity for the partitions. Each respective granularity can have corresponding counters as described in association with blocks 344 and 346.

Figure 4:
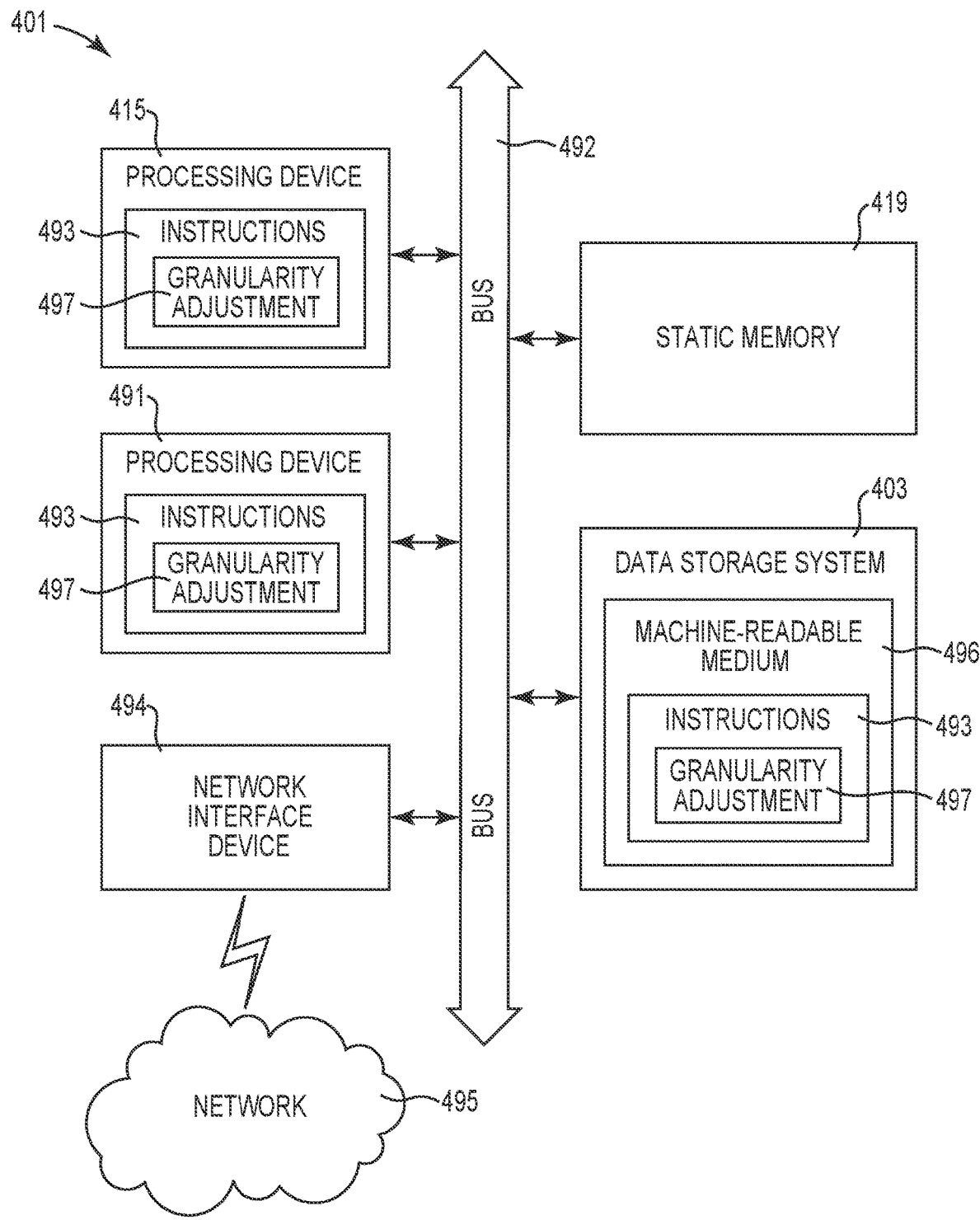
FIG. 4 is a block diagram of an example computer system in which embodiments of the present disclosure may operate.

FIG. 4 is a block diagram of an example computer system 401 in which embodiments of the present disclosure may operate. Within the computing system 401, a set of instructions, for causing a machine to perform one or more of the methodologies discussed herein, can be executed. The computing system 401 includes a processing device 415, a main memory 491, a static memory 419 (e.g., flash memory, static random access memory (SRAM), etc.), and a data storage system 403, which communicate with each other via a bus 492. The data storage system 403 can be analogous to the memory sub-system 103 described in associated with FIG. 1.

The processing device 415 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 415 can also be one or more special-purpose processing devices such as an ASIC, an FPGA, a digital signal processor (DSP), network processor, or the like. The processing device 415 is configured to execute instructions 493 for performing the operations and steps discussed herein. The computing system 401 can further include a network interface device 494 to communicate over a network 495.

The data storage system 403 can include a machine-readable storage medium 496 (also known as a computer-readable medium) on which is stored one or more sets of instructions 493 or software embodying one or more of the methodologies or functions described herein. The instructions 493 can also reside, completely or at least partially, within the main memory 491 and/or within the processing device 415 during execution thereof by the computing system 401, the main memory 491 and the processing device 415 also constituting machine-readable storage media.

In some embodiments, the instructions 493 can include instructions to implement functionality corresponding to the AI circuitry 113 as described in association with of FIG. 1. For example, the instructions 493 can include granularity adjustment instructions 497 to, as described herein adjust a granularity of an L2P table of the static memory 419 based on quantities of read operations and/or R/M/W operations performed on the static memory 419 and/or quantities of unaligned heads and/or tails of an L2P table of the static memory 419. While the machine-readable storage medium 496 is shown in an example embodiment to be a single medium, the term "machine-readable storage medium" should be taken to include a single medium or multiple media that store the one or more sets of instructions. The term "machine-readable storage medium" shall also be taken to include a medium that is capable of storing or encoding a set of instructions for execution by the machine and that cause the machine to perform one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, types of disk including floppy disks, optical disks, CD-ROMs, and magnetic-optical disks, read-only memories (ROMs), random access memories (RAMs), EPROMs, EEPROMs, magnetic or optical cards, or type of media suitable for storing electronic instructions, each coupled to a computer system bus.

The algorithms and displays presented herein are not inherently related to a particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to a particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes a mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
    a memory device; and
    a controller coupled to the memory device and configured to:
        maintain a logical-to-physical (L2P) table comprising a plurality of logical block addresses (LBAs) of the memory device, wherein the plurality of LBAs are organized as a plurality of partitions of the L2P table, wherein each partition of the L2P table includes a respective subset of the plurality of LBAs;
        monitor, for each partition of the L2P table, a quantity of read/modify/write (R/M/W) operations performed on the memory device at the respective subset of the plurality of LBAs;
        monitor, for each partition of the L2P table, a quantity of read operations performed on the memory device at the respective subset of the plurality of LBAs; and
        for each partition of the L2P table and based on the quantity of R/M/W operations and the quantity of read operations performed on the memory device at the respective subset of the plurality of LBAs, adjust a value of a respective corresponding granularity of the L2P table.

2. The apparatus of claim 1, wherein the controller is further configured to determine, for each partition of the L2P table, whether the quantity of R/M/W operations performed on the memory device at the respective subset of the plurality of LBAs exceeds a threshold quantity of R/M/W operations.

3. The apparatus of claim 2, wherein the controller is further configured to, responsive to determining, for a partition of the L2P table, that the quantity of R/M/W operations performed on the memory device at the respective subset of the plurality of LBAs exceeds the threshold quantity of R/M/W operations:
adjust the value of the respective granularity of the partition of the L2P table to a lesser value.

4. The apparatus of claim 1, wherein the controller is further configured to determine, for each partition of the L2P table, whether the quantity of read operations performed on the memory device at the respective subset of the plurality of LBAs exceeds a threshold quantity of read operations.

5. The apparatus of claim 4, wherein the controller is further configured to, responsive to determining, for a partition of the L2P table, that the quantity of read operations performed on the memory device at the respective subset of the plurality of LBAs exceeds the threshold quantity of read operations:
adjust the value of the respective granularity of the partition of the L2P table to a greater value.

6. The apparatus of claim 1, wherein the controller comprises artificial intelligence (AI) circuitry configured to adjust, for each partition of the L2P table, a value of the respective granularity of the respective subset of the plurality of LBAs based on the quantity of R/M/W operations and the quantity of read operations performed on the memory device at the respective subset of the plurality of LBAs.

7. An apparatus, comprising:
a memory device; and
a controller coupled to the memory device and configured to:
maintain a logical-to-physical (L2P) table comprising a plurality of logical block addresses (LBAs) of the memory device, wherein the plurality of LBAs are organized as a plurality of partitions of the L2P table, wherein each partition of the L2P table includes a respective subset of the plurality of LBAs;
receive a write command associated with an LBA of a partition of the plurality of partitions of the L2P table;
determine, for a first granularity, whether a subset of the plurality of LBAs, corresponding to the partition, has an unaligned head, wherein the partition utilizes the first granularity;
determine, for the first granularity, whether the subset of the plurality of LBAs, corresponding to the partition, had an unaligned tail; and
responsive to determining that, for the first granularity, the subset of the plurality of LBAs have an unaligned head or an unaligned tail, utilize a second granularity different than the first granularity for the subset of the plurality of LBAs.

8. The apparatus of claim 7, wherein:
the controller comprises a first counter and a second counter; and
the controller is further configured to:
responsive to determining, for the first granularity, that the subset of the plurality of LBAs has the unaligned head, increment a value of the first counter;
responsive to determining, for the first granularity, that the subset of the plurality of LBAs has the unaligned tail, increment a value of the second counter; and
responsive to the value of the first counter or the value of the second counter exceeding a threshold value, utilize the second granularity for the subset of the plurality of LBAs, wherein a value of the second granularity is less than a value of the first granularity.

9. The apparatus of claim 8, wherein the controller is further configured to, responsive to the value of the first counter or the value of the second counter not exceeding the threshold value, utilize the first granularity for the subset of the plurality of LBAs.

10. The apparatus of claim 8, wherein the controller is further configured to:
determine, for a third granularity, whether the subset of the plurality of LBAs has the unaligned head;
determine, for the third granularity, whether the subset of the plurality of LBAs has the unaligned tail; and
responsive to determining that the subset of the plurality of LBAs have the unaligned head or the unaligned tail, utilize a fourth granularity different than the third granularity for the subset of the plurality of LBAs.

11. The apparatus of claim 10, wherein:
the controller comprises a third counter and a fourth counter; and
the controller is further configured to:
responsive to determining, for the third granularity, that the subset of the plurality of LBAs has the unaligned head, increment a value of the third counter;
responsive to determining, for the third granularity, that the subset of the plurality of LBAs has the unaligned tail, increment a value of the fourth counter; and
responsive to the value of the third counter or the value of the fourth counter exceeding the threshold value, utilize the fourth granularity for the subset of the plurality of LBAs, wherein a value of the fourth granularity is less than a value of the third granularity.

12. The apparatus of claim 11, wherein the controller is further configured to:
responsive to the value of the third counter or the value of the fourth counter not exceeding the threshold value, utilize the third granularity for the subset of the plurality of LBAs.

13. An apparatus, comprising:
a memory device; and
a controller coupled to the memory device and configured to:
maintain a logical-to-physical (L2P) table comprising a plurality of logical block addresses (LBAs) of the memory device, wherein the plurality of LBAs are organized as a plurality of partitions of the L2P table, wherein each partition of the L2P table includes a respective subset of the plurality of LBAs;
receive a read command associated with an LBA of a partition of the plurality of the partitions of the L2P table;
prior to execution of the read command, determine, for a first granularity, a first quantity of read operations associated with execution of the read command, wherein a subset of the plurality of LBAs, corresponding to the partition, utilize the first granularity;
execute the read command using a second quantity of read operations and the first granularity;

determine, for the first granularity, whether the second quantity of read operations exceeds the first quantity of read operations; and responsive to determining that, for the first granularity, the second quantity of read operations exceeds the first quantity of read operations, utilize a second granularity different than the first granularity for the subset of the plurality of LBAs.

14. The apparatus of claim 13, wherein:

the controller comprises a first counter and a second counter; and the controller is further configured to:
increment a value of the first counter to the first quantity of read operations;
increment a value of the second counter to a difference of the second quantity of read operations and the first quantity of read operations; and
responsive to the value of the second counter exceeding a threshold value, utilize the second granularity for the subset of the plurality of LBAs, wherein a value of the second granularity is greater than a value of the first granularity.

15. The apparatus of claim 14, wherein the controller is further configured to, responsive to the value of the second counter not exceeding the threshold value, utilize the first granularity for the subset of the plurality of LBAs.

16. A method, comprising:

maintaining, using a controller coupled to a memory device, a logical-to-physical (L2P) table comprising a plurality of logical block addresses (LBAs) of the memory device, wherein:
the plurality of LBAs are organized as a plurality of partitions of the L2P table,
each partition of the L2P table includes a respective subset of the plurality of LBAs, and at least one of the subsets of the plurality of LBAs utilize a first granularity;
monitoring, using the controller and for the first granularity, a quantity of read/modify/write (R/M/W) operations performed on the memory device at a subset of the plurality of LBAs corresponding to a partition of the plurality of partitions;
prior to execution of a read command associated with the partition of the memory device, determining, using the controller and for the first granularity, a first quantity of read operations associated with execution of the read command;
monitoring, using the controller and for the first granularity, a second quantity of read operations performed on the memory device at the subset of the plurality of LBAs in association with execution of the read command; and
based on the quantity of R/M/W operations and a difference of the second quantity of read operations and the first quantity of read operations, determining, using the controller, whether to utilize a second granularity for the subset of the plurality of LBAs, wherein the second granularity is different from the first granularity.

17. The method of claim 16, further comprising:

assigning a first weight to the quantity of R/M/W operations;
assigning a second weight to the first quantity of read operations;
assigning a third weight to the second quantity of read operations;
determining, using the controller, whether a sum of the weighted quantity of R/M/W operations, the weighted first quantity of read operations, and the weighted second quantity of read operations exceeds a threshold value; and
responsive to determining that the sum exceeds the threshold value, utilizing the second granularity for the subset of the plurality of LBAs.

18. The method of claim 16, further comprising:

training a neural network implemented on the controller based on the quantity of R/M/W operations and the difference of the second quantity of read operations and the first quantity of read operations; and
determining, via the neural network, whether to utilize the second granularity for the subset of the plurality of LBAs.

19. The method of claim 16, wherein:

evaluating the first granularity comprises monitoring the quantity of R/M/W operations, determining the first quantity of read operations, and monitoring the second quantity of read operations, and
the method further comprises evaluating the first granularity periodically during operation of the memory device.

20. The method of claim 16, wherein:

evaluating the first granularity comprises monitoring the quantity of R/M/W operations, determining the first quantity of read operations, and monitoring the second quantity of read operations, and
the method further comprises evaluating the first granularity in response to a particular quantity of data being read from or written to the memory device at the subset of the plurality of LBAs.

* * * * *